United States Patent [19]

Heidish et al.

[11] Patent Number: 4,932,608
[45] Date of Patent: Jun. 12, 1990

[54] AIRCRAFT WINDSHIELD DESIGN AND METHOD OF USE

[75] Inventors: William E. Heidish, Huntsville, Ala.; Joseph T. Mueller, Florence, Ky.

[73] Assignee: PPG Industries, Inc., Pittsburgh, Pa.

[21] Appl. No.: 138,612

[22] Filed: Dec. 28, 1987

[51] Int. Cl.⁵ .................................................. B64C 1/14
[52] U.S. Cl. ...................................... 244/129.3; 52/1; 52/171
[58] Field of Search ............... 244/129.3; 52/171, 304, 52/172, 1

[56] References Cited

U.S. PATENT DOCUMENTS

| | | | |
|---|---|---|---|
| 2,304,691 | 12/1942 | Hund | 52/171 |
| 3,192,575 | 7/1965 | Rosenau | 244/129.3 |
| 3,452,553 | 7/1969 | Derhin | 244/129.3 |
| 4,299,639 | 11/1981 | Bayer | |
| 4,333,282 | 6/1982 | Medlin | |
| 4,525,966 | 7/1985 | Litchfield | |
| 4,567,703 | 2/1986 | Ricks | 52/171 |
| 4,687,687 | 8/1987 | Terneu | 52/171 |
| 4,721,636 | 1/1988 | Hood | 52/171 |
| 4,725,710 | 2/1988 | Ramus | 52/171 |

OTHER PUBLICATIONS

Air Force Report No. AFWAL-84-3019.

Primary Examiner—John E. Murtagh
Attorney, Agent, or Firm—Andrew C. Siminerio

[57] ABSTRACT

An aircraft windshield having an outer glass ply spaced from an inner polycarbonate laminate. The space between the two structure is pressurized with gas at a level approximately one pound per square inch less than the aircraft cabin pressure.

18 Claims, 1 Drawing Sheet

AIRCRAFT WINDSHIELD DESIGN AND METHOD OF USE

BACKGROUND OF THE INVENTION

1. Field of the Invention

The present invention relates to an aircraft window and more particularly to an aircraft windshield with an outer glass ply spaced from an inner ply by a pressurized air gap.

2a. Technical Considerations

As an aircraft flies to higher altitudes, the air within the aircraft cabin is pressurized. As a result, the windows in the aircraft experience cyclic loading each time the aircraft internal pressure changes in response to the altitude. This cyclic loading on polycarbonate plies of the windows may lead to premature fatigue failure. In addition, the internal pressure causes the outboard polycarbonate or polycarbonate laminate ply of the aircraft window to deflect outwardly, changing its surface configuration. This effect is particularly important in military aircraft where a change in a surface configuration reduces the aircraft's ability to avoid radar detection. Furthermore, the outer polycarbonate surface is subject to abrasion and environmental degradation.

It would be useful to have an aircraft window, and in particular an aircraft windshield that avoids these deleterious effects while providing a structurally sound transparency capable of withstanding impacts that are typical in an aircraft windshield.

2b. Patents of Interest

Bayer U.S. Pat. No. 4,299,639 teaches a laminate assembly of two or more parallel glass panes and one or more layers of transparent synthetic plastic material plies. The glass panes are initially spaced apart by an airspace that is subsequently filled with the plastic material, which is injected into the air gap in a liquid state.

Medlin U.S. Pat. No. 4,333,282 teaches a multilayered bulletproof window including a multilayered outer section with an outer safety plate glass ply, and an inner section composed of polycarbon laminate. The inner and outer sections are separated by a space containing dry nitrogen gas at about 2½ lbs per square. inch of pressure. The space is necessary to allow for differential rates of expansion and contraction of the sections and layers without damaging the window.

Litchfield et al. U.S. Pat. No. 4,525,966, teaches a window system construction including spaced apart glass panes within a window frame. The window construction includes glazing beads inserted between the glass plies and the frame which incorporates an arrangement to prevent disengagement of the glazing beads other than by breaking the glass plies.

SUMMARY OF THE INVENTION

The present invention provides an aircraft window with an outer glass ply spaced from an inner plastic laminate. Gas in the gap between the ply and laminate is pressurized so that it is at or near the pressure in the aircraft cabin, and in one particular embodiment is about 1 psi less than the aircraft cabin pressure. The window improves overall aircraft performance by reducing the amount of outward deflection of the windows due to pressurization because the glass ply being inherently stiffer, will deflect outwardly less than a plastic ply under similar pressurization conditions. In addition, since the pressure on each major surface of the inner ply or laminate will be very nearby the same, it will not be subjected to cyclic loading that may lead to accelerated fatigue.

In one particular embodiment of the invention, the window is an aircraft windshield. The outer ply is chemically tempered glass and the laminate includes a plurality of polycarbonate plies laminated together with a silicone interlayer. The outer surface of the windshield includes a transparent electrically conductive coating system that is grounded to the aircraft structure. In addition, the glass and laminate surfaces forming the gap have an anti-reflective coating to eliminate any double imaging effects due to the windshield design.

DETAILED DESCRIPTION OF THE INVENTION

Figure 1:
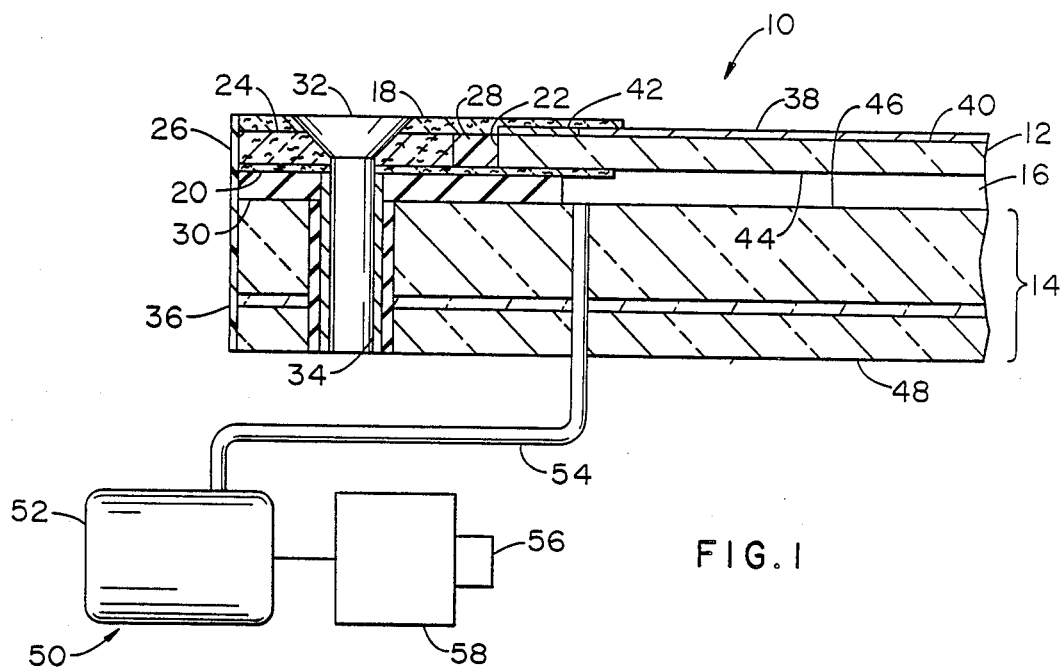
FIG. 1 is a partial cross-sectional view of an aircraft window incorporating the novel features of the present invention.

FIG. 1 illustrates a cross-sectional view of an aircraft window assembly 10 which is the subject of the present invention. It should be appreciated that the assembly 10 may be flat, slightly curved, or dramatically curved to form an aircraft canopy. Outer glass ply 12 is spaced from an inner ply 14 by sealed space or gap 16. In the particular embodiment shown in FIG. 1, ply 14 is a polycarbonate laminate but it should be appreciated that it may also be, for example, a single polycarbonate ply or other transparent single or multi-layered plastic assemblies. The gap 16 provides a thermal barrier between the glass ply 12 and laminate 14 and allows the outer glass ply to carry the internal pressure load of the pressurized aircraft cabin (not shown) as will be discussed later. Mounting straps 18 and 20 are secured to both sides of glass ply 12 about its peripheral edge 22 by a high temperature conductive structural adhesive to provide a rigid support that evenly distributes the pressurization loading along the glass edge and prevents the development of a bending moment along the edge 22. If desired, the outboard perimeter of the glass ply 12 may be routed to a depth equal to the thickness of outer strap 18 and adhesive so that when the assembly 10 is assembled, it will have a flush outer surface. Mounting block 24 located between straps 18 and 20 extends to the edge 26 of the window assembly 10 with bumper blocks 28 filling in the space between peripheral edge 22 of glass 12 and the mounting block 24. Silicone rubber seal 30 is positioned about the periphery of the assembly 10 between the glass ply 12 and mounting block 24 outer assembly and polycarbonate laminate 14 to seal the gap 16 and prevent any surface damage to the laminate 14. Bolts 32 (only one shown in FIG. 1) extend through mounting block 24, seal 30, and a spacer 34 in polycarbonate laminate 14 and into the airframe (not shown) to secure the assembly 10 to the aircraft. An edge seal on 36 may be provided about the peripheral edge 26 of assembly 10 to prevent delamination.

If desired, a transparent conductive coating system 38 may be applied to the outboard surface 40 of the glass ply 12 and connected via bus bar 42 to a ground (not shown) such as the airframe (not shown) to collect static electric charges accumulated on the assembly 10 and/or provide radar cross-section reduction for the aircraft. In addition, depending on the effects on double imaging due to the design of the windshield assembly 10, anti-reflective coatings may be applied to the interior surfaces 44 and 46 of the assembly 10 that form the gap 16. An abrasive resistant coating is applied to the inboard surface 48 of the polycarbonate laminate 14 to increase its effective service life.

Air bladder system 50 provides gas under pressure into the gap 16 to better maintain the shape of the overall aircraft, as will be discussed later. The pressurized gas may be cabin air vented into the gap 16 or gas provided from a separated reservoir 52 of the system 50, for example nitrogen gas. Nitrogen gas is preferred over cabin air because the nitrogen gas has less contaminates and moisture than the internal heated cabin air.

Although not limiting in the present invention, in the particular embodiment shown in FIG. 1, reservoir 52 of system 50 is connected to the gap 16 via conduit 54 that extends through the laminate 14. Sensor 56, for example a pressure gauge, monitors the cabin pressure and control 58 maintains a desired pressure in gap 16 in response to the aircraft cabin pressure. It would be obvious that conduit 54 may extend through seal 30 to access the gap 16 with the pressurized air. In an embodiment of the invention wherein the gap 16 is pressurized with air vented from the aircraft cabin, conduit 54 may operate as a vent interconnecting the aircraft cabin with the gap 16.

In one particular embodiment of the invention, glass ply 12 was a chemically tempered 0.187 inch (0.47 cm) thick monolithic glass ply separated from polycarbonate laminate 14 by a 0.187 inch (0.47 cm) wide gap 16. Laminate 14 included inner 0.52 inch (1.32 cm) thick and outer 0.25 inch (0.64 cm) thick aircraft grade polycarbonate plies laminated together with a 0.06 inch (0.15 cm) thick urethane interlayer. The conductive coating system 38 on glass ply surface 40 was an indium tin oxide film with an antimony tin oxide overcoat providing a surface resistivity of approximately 15 ohms per square or less. Straps 18 and 20 were 0.02 inch (0.05 cm) thick high temperature fiber glass secured to the glass ply 12 by a conductive structural adhesive such as silver filled epoxy. The mounting block 24 was high temperature fiber glass and bumper block 28 was conductive silicone rubber. Block 28 provided a medium from the bus bar 42 to ground the coating system 38 to the airframe (not shown). The abrasion resistant coating on laminate surface 48 a UV curable urethane.

The glass ply/air gap/polycarbonate laminate assembly 10 provided in the present invention has several design advantages over a non-gapped windshield design. The air gap 16 provides a better thermal barrier than the same thickness of silicone interlayer. The assembly 10 also allows the outer glass ply 12 to carry the internal pressure load of the aircraft. Control 58 senses the air pressure within the aircraft cabin and maintains the air pressure within gap 16 at or near the cabin pressure. As a result, polycarbonate laminate 14 will be subjected to minimal pressure load and the outer glass ply 12 rather than the polycarbonate laminate 14 will resist internal pressure. The glass ply 12 will deflect less than the laminate 14 because the outer glass ply is inherently stiffer than the inner laminate and preserves the surface configuration of the aircraft. The pressurized air gap 16 will also reduce the outward deflection of the inner polycarbonate laminate 14 since the pressure will be about the same on both sides of the laminate and should prolong its life due to lack of cyclic fatigue. When air in gap 16 is vented directly from the aircraft cabin, the pressure in the gap 16 will be the same as that within the cabin. Although not limited in the present invention, when the gas in the gap 16 is other than cabin air, e.g., nitrogen, the gas in the gap 16 is pressurized preferably to approximately 1 psi less than internal cabin pressure so as to prevent leakage of gas from the gap 16 into the aircraft cabin. As a result, polycarbonate laminate 14 will be subjected to only a 1 psi load which will result in minimal deflection and greatly reduced cyclic fatigue. It should be appreciated that the differential pressure between the opposing faces of the laminate 14 could be greater. This will result in greater cyclic loading of the laminate 14 but less outward deflection of the glass ply 12.

In addition, if damage occurs to the outer glass ply 12 and none to the polycarbonate laminate 14, the outer glass ply 12 can be removed relatively easily and replaced with a new glass ply 12, thus lowering the maintenance cost.

The air gap design of the present invention would also eliminate delamination of the outer glass ply 12 from the assembly 10 since it is not laminated to the polycarbonate laminate 14. The shear stresses built up during thermal exposure caused by differential expansion of the two dissimilar materials i.e., the glass and polycarbonate will also be eliminated, thus lowering the stresses on the assembly 10.

Figure 2:
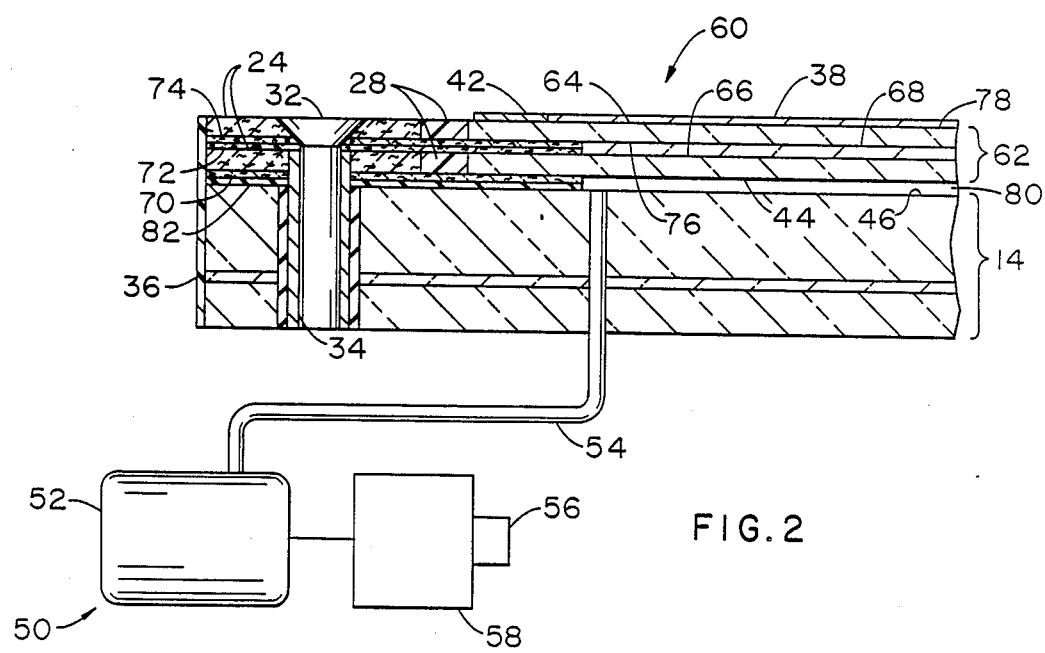
FIG. 2 is a view similar to FIG. 1 illustrating an alternate embodiment of the invention.

FIG. 2 illustrates a variation of the design shown in FIG. 1. Assembly 60 incorporates a laminated glass outer shell 62 as opposed to monolithic ply 12. In one particular embodiment, two plies 64 and 66 of ⅛ inch (0.32 cm) thick chemically tempered glass are laminated with a 0.06 inch (0.15 cm) thick high temperature silicone interlayer 68. Straps 70 and 72 are secured to both sides of inner glass ply 66 and strap 74 is secured to the inner surface 76 of outer ply 64 with high temperature structural adhesive. To provide a constant thickness of the shell 62 at the edge attachment, the total thickness of straps 72 and 74 should be less than or equal to the thickness of the interlayer 68. If the strap thickness is less, additional straps or other filler material may be added between the straps 72 and 74 as required. An additional strap (not shown) may be secured to the outboard surface 78 of the outer glass ply 64. The laminated shell 62 is separated by a 0.06 inch (0.15 cm) air gap 80 and is pressurized in a manner as discussed earlier. A silicone rubber seal 82 is positioned about the periphery of the assembly 60 to seal gap 80 and prevent surface damage to the laminate 14. The thickness of the seal 82 plus strap 70 should be equal to the desired separation of gap 80.

The overall glass ply (plies) plus gap dimension for the embodiments illustrated in FIGS. 1 and 2 is maintained at 0.37 inches (0.94 cm) in order to maintain the aircraft transparency's edge thickness specifications but it should be appreciated that gap 68 may be enlarged if permitted.

A comparison between the two embodiments shows that each provides particular advantages. The larger air gap 16 in the embodiment shown in FIG. 1, provides a greater insulative effect on the laminate 14. In addition, by using one less silicone interlayer, the amount of haze will be reduced and the light transmission should increase depending upon the efficiency of the anti-reflective coatings (if required). The cost of the silicone layer 68 is also saved. Furthermore, by using a single glass ply for outer ply 12, if the glass is broken, for example by impact, the glass fragments will leave the assembly 10 and provide an unobstructed view therethrough. It should be appreciated that if the outer glass ply fails, the inner laminate 14 must assume the pressurization load resulting from the cabin pressure. An advantage to using a laminated glass outer shell 62 as shown in FIG. 2 is that if undetected damage to the outer glass surface of the shell 62 or minor foreign object damage results in a cracked outer ply 64, the pilot of the aircraft can continue the flight since the inner glass ply 66 provides failsafe protection and thus improved reliability. In addition, as long as the inner glass ply remains structurally sound, the shell 62 may still assume the pressurization load via gap 80.

A drawback of having the laminated glass shell 62 as opposed to the monolithic glass ply 12 is that a damaged outer glass ply is shell 62 will remain with the assembly 60 and may obstruct the viewing therethrough. In addition, the weight of the window assembly will increase since the monolithic ply 12 weighs less than the multilayered laminate shell 62, depending on the thickness of the glass plies. The weight increase is estimated to be approximately 0.37 lbs per square foot of windshield (0.88 grams/cm$^2$.) when comparing the two embodiments of the windshield described earlier. Furthermore, the cost will be increased since two plies of glass and interlayer are required.

The forms of the invention shown and described in this disclosure represent illustrative preferred embodiments thereof. It is understood that various changes may be made without the party from the spirit of the invention, except in so far as defined in the claimed subject matter that follows.

We claim:

1. A transparent vision unit for an enclosed pressurized vehicle, the vehicle having means therein to monitor pressure within said vehicle, means for containing gas under pressure, and means acting on said gas containing means and responsive to said monitoring means to control the flow of gas from said gas containing means, the unit comprising:
    an outer ply having a predetermined deflection value;
    an inner ply having a predetermined deflection value less than that of said outer ply;
    means for spacing said plies to provide a sealed space therebetween;
    means connecting said sealed space and said pressurized gas containing means; and
    means to move gas under pressure into and out from said sealed space to maintain the gas pressure within said sealed space at about said monitored vehicle pressure in response to said control means.

2. The unit as in claim 1 wherein said pressurized gas containing means is said enclosed pressurized vehicle and said connecting means includes a vent interconnecting said sealed space with said pressurized vehicle.

3. The unit as in claim 2 wherein said gas is cabin air.

4. The unit as in claim 2 wherein said unit is an aircraft window and said vehicle is a pressurized aircraft.

5. The unit as in claim 4 wherein said unit is an aircraft windshield.

6. An aircraft window for a pressurized aircraft comprising:
    an outer ply having a predetermined deflection value;
    an inner ply having a predetermined deflection value less than that of said outer ply;
    means for spacing said plies to provide a sealed space therebetween;
    a pressure gauge within said aircraft to monitor pressure within said aircraft;
    a pressurized gas reservoir to move gas under pressure into said sealed space; and
    a controller to control the movement of the pressurized gas from said reservoir into said sealed space in response to the monitored pressure within said aircraft to maintain the gas pressure within said sealed space at about said monitored aircraft pressure.

7. The unit as in claim 6 wherein said gas is nitrogen.

8. The unit as in claim 6 wherein said outer ply is a glass laminate.

9. The unit as in claim 6 wherein said outer ply is a chemically tempered glass ply.

10. The unit as in claim 6 wherein said inner ply is a polycarbonate laminate.

11. The unit as in claim 6 wherein said controller means maintains gas pressure in said sealed space at a pressure approximately one pound per square inch less than the pressure within said aircraft.

12. The unit as in claim 6 further including an anti-reflective coating on at least one of the major surfaces of said glass and polycarbonate laminate forming said space.

13. The unit as in claim 6 further including a transparent conductive coating system on the outer exposed major surface of said glass ply and means to electrically ground said system.

14. A method of reducing the change in the configuration of an aircraft due to pressurization of the aircraft and deflection of an aircraft window mounted therein comprising:
    providing an aircraft window with an outer ply having a predetermined deflection value and an inner ply having a predetermined deflection value less than that of said outer ply, spaced from said outer ply to provide a sealed space therebetween;
    providing means within said aircraft to monitor pressure within said aircraft; and
    moving gas under pressure from a pressurized gas reservoir into said sealed space to maintain the gas pressure in said sealed space at about equal to said monitored pressure within said aircraft such that said outer ply deflects due to said gas pressure.

15. The method as in claim 14 wherein said moving step includes maintaining said gas pressure within said sealed space at a pressure approximately one pound per square inch less than the monitored aircraft pressure.

16. A method of reducing the change in the configuration of an aircraft due to pressurization of the aircraft and deflection of a transparency mounted therein comprising:
    providing a transparency in said aircraft, said transparency having an outer ply having a predetermined deflection value and an inner ply having a predetermined deflection value of less than that of said outer ply, spaced from said outer ply to provide a sealed space therebetween;
    monitoring the pressure within said aircraft; and
    moving gas under pressure into said sealed space in response to said monitoring step such that said outer ply deflects due to said gas pressure.

17. The method as in claim 16 further including the step of maintaining the gas pressure within said sealed space at about equal to said monitored pressure within said aircraft.

18. The method as in claim 17 further including the step of venting said sealed space to the interior of said aircraft so as to equalize the gas pressure therebetween.

* * * * *